(12) United States Patent
Norris et al.

(10) Patent No.: US 7,748,211 B2
(45) Date of Patent: Jul. 6, 2010

(54) VAPOR COOLING OF DETONATION ENGINES

(75) Inventors: James W. Norris, Lebanon, CT (US);
Wendell V. Twelves, Jr., Glastonbury, CT (US)

(73) Assignee: United Technologies Corporation, Hartford, CT (US)

(*) Notice: Subject to any disclaimer, the term of this patent is extended or adjusted under 35 U.S.C. 154(b) by 868 days.

(21) Appl. No.: 11/642,010

(22) Filed: Dec. 19, 2006

(65) Prior Publication Data
US 2008/0141954 A1 Jun. 19, 2008

(51) Int. Cl.
F02K 5/02 (2006.01)
F02K 7/00 (2006.01)

(52) U.S. Cl. .................. 60/247; 60/39.38; 60/226.1; 60/730; 416/95

(58) Field of Classification Search .......... 60/247, 60/39.38, 39.76, 226.1, 262, 267, 736, 806, 60/730; 416/95, 96 R, 96 A; 123/41.21, 123/41.23
See application file for complete search history.

(56) References Cited

U.S. PATENT DOCUMENTS

| | | | |
|---|---|---|---|
| 3,334,685 A | 8/1967 | Burggraf et al. | |
| 3,355,883 A * | 12/1967 | Beam, Jr. ............... | 60/39.511 |
| 3,651,645 A * | 3/1972 | Grieb ..................... | 60/262 |
| 3,756,020 A * | 9/1973 | Moskowitz et al. ...... | 60/760 |
| 3,844,679 A | 10/1974 | Grondahl, et al. | |
| 4,549,505 A * | 10/1985 | Hirano ................... | 123/41.08 |
| 4,570,579 A * | 2/1986 | Hirano ................... | 123/41.02 |
| 4,648,356 A * | 3/1987 | Hayashi ................ | 123/41.21 |
| 4,766,852 A * | 8/1988 | Hirano et al. .......... | 123/41.21 |
| 4,782,658 A * | 11/1988 | Perry .................... | 60/226.1 |
| 4,788,943 A * | 12/1988 | Hayashi ................ | 123/41.27 |
| 4,932,365 A * | 6/1990 | Marschall et al. ...... | 123/41.05 |
| 5,299,418 A * | 4/1994 | Kerrebrock ............. | 60/806 |
| 5,309,870 A * | 5/1994 | Ap ....................... | 123/41.21 |
| 5,513,489 A * | 5/1996 | Bussing ................. | 60/39.38 |
| 5,782,076 A * | 7/1998 | Huber et al. ........... | 60/782 |
| 5,857,836 A | 1/1999 | Stickler et al. | |
| 5,954,478 A | 9/1999 | Stickler et al. | |
| 6,027,078 A * | 2/2000 | Crouch et al. ......... | 244/204 |
| 6,192,670 B1 * | 2/2001 | Kerrebrock ............. | 60/806 |
| 6,553,752 B2 * | 4/2003 | Anderson ............... | 60/39.38 |
| 6,668,542 B2 * | 12/2003 | Baker et al. ........... | 60/247 |
| 6,931,834 B2 | 8/2005 | Jones | |

(Continued)

FOREIGN PATENT DOCUMENTS

WO WO 2005/073539 A1 8/2005

OTHER PUBLICATIONS

S. Narayanan K.R., "What is a Heat Pipe?", printed article only.

*Primary Examiner*—William H Rodríguez
(74) *Attorney, Agent, or Firm*—Kinney & Lange, P.A.

(57) ABSTRACT

An engine cooling system includes a combustion chamber assembly configured to generate detonation waves and a first vapor cooling assembly. The combustion chamber assembly defines a flowpath between an inner liner and an outer liner. The first vapor cooling assembly includes a vaporization section located adjacent to the flowpath and a condenser section spaced from the flowpath, and is configured to transport thermal energy from the vaporization section to the condenser section through cyclical evaporation and condensation of a working medium sealed within the first vapor cooling assembly.

16 Claims, 2 Drawing Sheets

U.S. PATENT DOCUMENTS 6,990,797 B2    1/2006  Venkataramani et al.
7,228,683 B2 *  6/2007  Henry .......................... 60/204

2007/0022732 A1  2/2007  Holloway et al.

* cited by examiner

VAPOR COOLING OF DETONATION ENGINES

BACKGROUND OF THE INVENTION

The present invention relates to systems for cooling detonation engines, and more particularly to vapor cooling systems for cooling detonation engines.

Known gas turbine engines have utilized superalloys, thermal barrier coatings (TBCs), and film cooling schemes in order to provide combustion chamber structures that can operate efficiently at high temperatures and pressure while still maintaining a relatively long component lifespan. In order to improve engine efficiency, it has been desired to develop engines that utilize detonation in addition to or instead of slower speed, non-detonative combustion. Utilization of detonation schemes (e.g., pulse detonation or continuous detonation) takes advantage of the thermodynamic benefits of fuel burn recovery, to increase engine fuel efficiency.

However, detonation engines present a number of difficulties in providing cooling to engine components in a manner that is reliable and effective. In conventional non-detonation engines, maximum temperatures are typically no more than about 1,649° C. (3,000° F.). With detonation engines, maximum temperatures can be as high as about 2,538° C. (4,600° F.). At those higher temperatures present in detonation engines, TBCs applied to superalloys may not provide sufficient thermal protection or be sufficiently durable. It is desired to maintain metal alloy temperatures below about 1,093° C. (2,000° F.) during operation. Moreover, sections of detonation engines, especially sections of pulse detonation engines, can be subject to sudden pressure spikes and turbulence as a natural consequence of the detonation process. The pressure spikes and turbulence may cause disruptive backflow or aspiration through film cooling holes, that is, acute pressure spikes or turbulence may cause hot flowpath gases to flow "backwards" into cooling holes or otherwise disrupt the film cooling. Such backflow or aspiration may make film cooling unsuitable for use with detonation engines.

BRIEF SUMMARY OF THE INVENTION

An engine cooling system includes a combustion chamber assembly configured to generate detonation waves and a first vapor cooling assembly. The combustion chamber assembly defines a flowpath between an inner liner and an outer liner. The first vapor cooling assembly includes a vaporization section located adjacent to the flowpath and a condenser section spaced from the flowpath, and is configured to transport thermal energy from the vaporization section to the condenser section through cyclical evaporation and condensation of a working medium sealed within the first vapor cooling assembly.

DETAILED DESCRIPTION

In general, the present invention relates to detonation engines that utilize a vapor cooling assembly to cool containment walls adjacent to a portion of a gas flowpath where detonation waves are typically present during operation. The vapor cooling assembly includes a vaporization section located adjacent to the gas flow path where it is desired to remove thermal energy, and a condenser section located away from the gas flow path where it is desired to expel thermal energy. The vapor cooling assembly is configured to transport thermal energy from the vaporization section to the condenser section at a relatively high rate through cyclical evaporation and condensation of a working medium sealed within the vapor cooling assembly. The condenser section can alternatively expel thermal energy to a fan bypass stream, to fuel that acts as a heat sink, or to other fluids that permit thrust recovery of that thermal energy.

Figure 1:
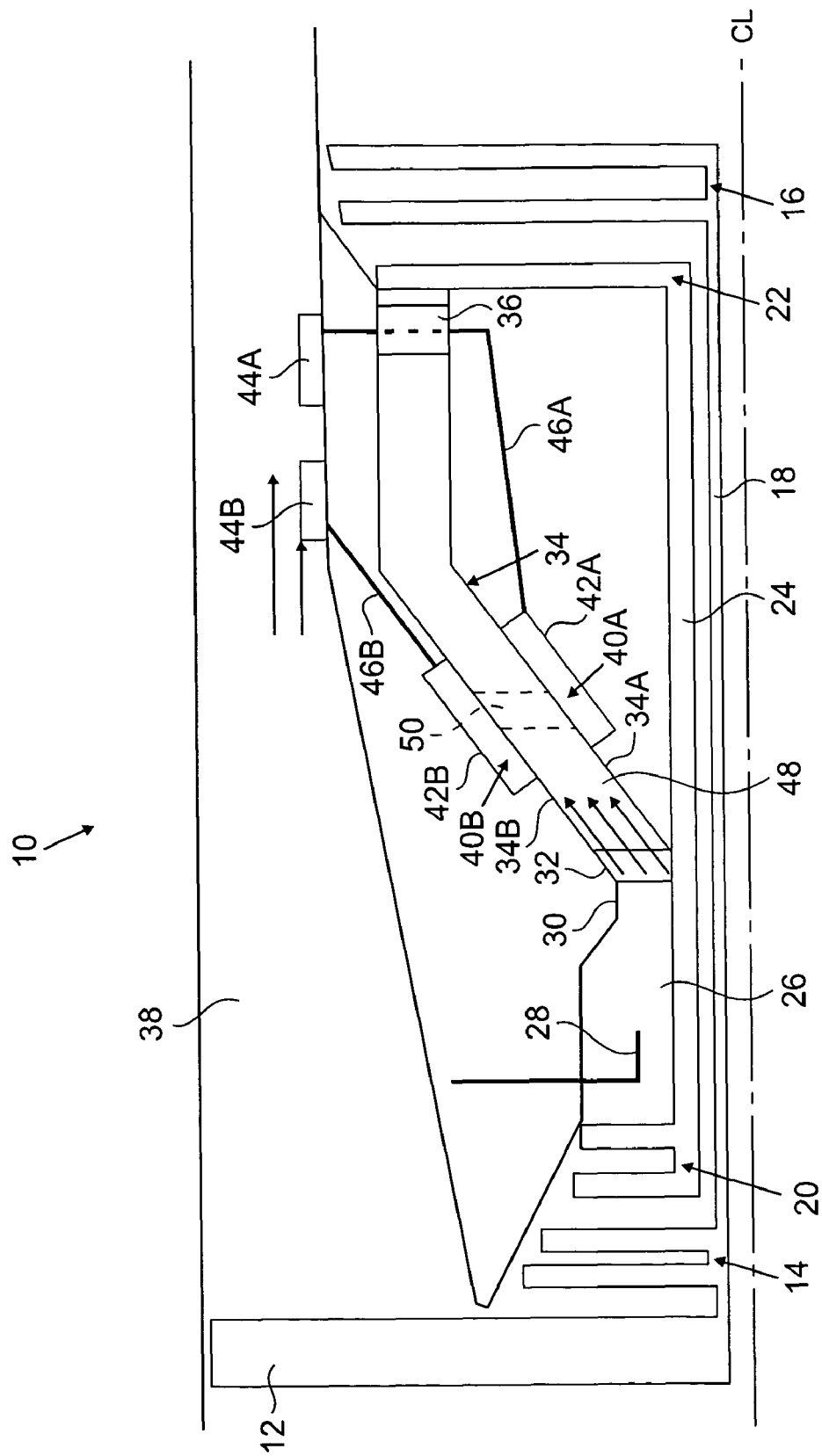
FIG. 1 is a schematic illustration of a hybrid turbofan detonation engine system having a pair of vapor cooling assemblies according to the present invention.

FIG. 1 is a schematic illustration of a hybrid turbofan detonation engine system 10 that includes two spools. Only a portion of the engine system 10 above an engine centerline CL is shown in FIG. 1 for simplicity. One spool (i.e., a low pressure spool) comprises a fan section 12, a low pressure compressor section 14, a low pressure turbine section 16 and a low pressure shaft 18. The other spool (i.e., a high pressure spool) comprises a high pressure, compressor section 20, a high pressure turbine section 22, and a high pressure shaft 24. The engine system 10 further includes an isolator section 26, a first set of fuel injection ports 28, a neck-down section 30, a combination vane and fuel injection port assembly 32, a combustion chamber 34 defined between an inner containment wall (or liner) 34A and an outer containment wall (or liner) 34B, a set of exit nozzle vanes 36, and a fan bypass duct 38. In addition, the engine system 10 includes vapor cooling assemblies 40A and 40B that respectively encompass first and second vaporization sections 42A and 42B, first and second condenser sections 44A and 44B, and first and second connecting structures 46A and 46B.

In the embodiment illustrated in FIG. 1, the engine system 10 is a hybrid type that incorporates elements of both conventional gas turbine engines as well as elements of detonation engines. It should also be recognized that the engine system 10 is shown in simplified form in FIG. 1, and could include other components not specifically shown or described. For instance, an ignition assembly is not specifically shown.

A main gas flowpath is defined by the engine system 10 as air passes through the fan section 12, the low pressure compressor 14, the high pressure compressor 20, the isolator section 26, the neck-down section 30, the vane and fuel injection assembly 32, the combustion chamber 34, the nozzle vanes 36, the high pressure turbine section 36, and the low pressure turbine section 16. A fan bypass stream is defined through the fan bypass duct 38, as air is forced through the duct 38 by the fan section 12. The fan stream is defined radially outward from the main gas flowpath. Both the main gas flowpath and the fan stream are responsible for producing thrust.

In operation, air is drawn into both the fan stream and the main gas flowpath by the fan section 12. The air that enters the main gas flowpath is compressed by the low pressure compressor section 14 and the high pressure compressor section 20. Fuel from the fuel injection ports 28 is then mixed with the compressed air in the isolator section 26, and additional fuel is introduced to the main gas flowpath by the combination vane and injector port assembly 32. The vanes 32 straighten airflow or otherwise condition it as desired for detonation. At the combustion chamber 34, detonation of a mixture of the fuel and air is initiated. Hot exhaust gases are permitted to diffuse and expand within a generally conical region 48 formed between the inner and outer containment walls 34A and 34B of the combustion chamber 34. The exhaust gases then pass the nozzle vanes 36, and drive the high pressure turbine section 22 and the low pressure turbine section 16. As will be understood by those skilled in the art, rotation of the turbine sections 16 and 22 drives the compressor sections 14 and 20 via the respective shafts 18 and 24.

Detonation waves are generated in the combustion chamber 34. The engine system 10 can operate under either a pulse detonation scheme or a continuous detonation scheme, as will be understood by those skilled in the art. Under a continuous detonation scheme, a continuous detonation zone 50 is defined generation within the conical region 48 of the combustion chamber 34, deflagration waves generally achieve sufficient propagation velocity in the zone 50 to become detonation waves. In any case, detonation is generally confined to relatively small, localized regions that can be on an essentially molecular level. The neck-down section 30 helps contain detonation waves within the combustion chamber 34, and helps prevent detonation waves from migrating upstream past the isolator section 26 and into the compressor sections 14 and 20.

The vapor cooling assembly 40 is configured to provide cooling to components heated by the detonation process. In the illustrated embodiment, the first vaporization section 42A is positioned adjacent to the main gas flowpath at the inner containment wall 34A of the combustion chamber 34. The connection structure 46A extends from the first vaporization section 42A across the main gas flowpath through one or more of the nozzle vanes 36 and to the first condenser section 44A. The second vaporization section 42B is positioned adjacent to the main gas flowpath at the outer containment wall 34B of the combustion chamber 34. The connection structure 46B extends from the first vaporization section 42A to the second condenser section 44B. The first and second vaporization sections 42A and 42B are each substantially aligned with the continuous detonation zone 50. The first and second condenser sections 44A and 44B are each located at the fan bypass duct 38, and are within or adjacent to the fan stream.

Exposed external faces of the first and second vaporization sections 42A and 42B form portions of the respective inner and outer containment walls 34A and 34B of the combustion chamber. Those external faces of the first and second vaporization sections 42A and 42B can be substantially smooth. Likewise, external faces of the first and second condenser sections 44A and 44B can be substantially smooth and form portions of walls of the fan by pass duct 38, or can extend into the fan stream and have an aerodynamic shape to better transfer heat to the fan stream while reducing drag.

The first and second vaporization sections 42A and 42B are located at or near the narrow, forward portion of the conical region 48 of the combustion chamber 34. There is generally a greater need to remove thermal energy near the forward portion of the conical region 48 than from more aft, downstream regions because exhaust gases are able to expand and cool as they move aft along the main gas flowpath. However, it should be recognized that the particular locations and configurations of the vaporization sections 42A and 42B can vary in alternative embodiments. For example, the vaporization sections 42A and 42B could alternatively extend along substantially the entire inner and outer containment walls 34A and 34B of the combustion chamber 34. Moreover, in further alternative embodiments, the use of vapor cooling assemblies 40A and 40B can be combined with conventional film cooling structures at nearby locations.

The vapor cooling assemblies 40A and 40B are each sealed, and each contains a working medium. The vapor cooling assemblies 40A and 40B each function as heat pipes that use an evaporative cooling cycle to transfer thermal energy through the evaporation and condensation of a working medium. In particular, the vapor cooling assembly 40A utilizes an evaporative cooling cycle to transfer thermal energy from the inner containment wall 34A of the combustion chamber 34 to the fan stream passing through the fan bypass duct 38. The vapor cooling assembly 42B also utilizes an evaporative cooling cycle to transfer thermal energy from the outer containment wall 34A of the combustion chamber 34 to the fan stream passing through the fan bypass duct 38. Thermal energy absorbed by the inner and outer containment walls 34A and 34B from the hot exhaust gases in the combustion chamber 34 heats the respective first and second vaporization sections 42A and 42B, which causes the working medium in the first and second vaporization sections 42A and 42B to evaporate. Moreover, the relatively cool air in the fan stream absorbs thermal energy from the first and second condenser sections 44A and 44B, and causes the working medium to condense. The working medium physically moves between the first and second vaporization sections 42A and 42B and the first and second condenser sections 44A and 44B via the respective connection structures 46A and 46B, in order to transfer the thermal energy between the locations where evaporation and condensation occur.

The internal configuration of the vapor cooling assemblies 40A and 40B can be of any conventional configuration. The particular arrangement and location of the subcomponents of the assemblies 40A and 40B will vary according to the particular configuration for the engine system 10. However, it is desirable to utilize conventional capillary action structures (e.g., wick structures) or a capillary action foam inside the vapor cooling assemblies 40A and 40B. The use of a capillary action in a well-known manner facilitates desired movement of the condensed working medium along an established path from the condenser sections 44A and 44B to the vaporization sections 42A and 42B without requiring the aid of gravity or other orientation-specific limits.

The composition of the working medium used in each of the vapor cooling assemblies 40A and 40B is selected according to the particular operating conditions at which heat transfer is desired. Typically, working media conventionally used with evaporative cooling cycles are dependent upon operation within a particular range of temperature conditions (as well as pressure conditions). It is therefore necessary to select a suitable working medium based on the particular conditions under which each of the vapor cooling assemblies 40A and 40B is expected to operate, as will be understood by those skilled in the art. Temperatures in detonative engines, such as in the engine system 10, can reach up to about 2,538° C. (4,600° F.) in discrete regions, although actual engine temperatures will vary for different applications. For instance, while the vapor cooling assemblies 40A and 40B are operational, the engine system 10 is configured such that the average gas flowpath temperature in will generally not exceed the maximum temperature limits for the materials (e.g., metals and ceramics) used in and along the main gas flowpath. A non-exclusive list of possible working media is provided in Table 1, although those skilled in the art will recognize that other working medium materials can be used.

TABLE 1

| Working Medium | Melting Point (° C.) | Boiling Point (° C. at 101.3 kPa) | Approximate Useful Range (° C.) |
|---|---|---|---|
| Helium | −271 | −261 | −271 to −269 |
| Nitrogen | −210 | −196 | −203 to −160 |
| Ammonia | −78 | −33 | −60 to 100 |
| Acetone | −95 | 57 | 0 to 120 |
| Methanol | −98 | 64 | 10 to 130 |
| Flutec PP2 ™ | −50 | 76 | 10 to 160 |
| Ethanol | −112 | 78 | 0 to 130 |
| Water | 0 | 100 | 30 to 200 |

TABLE 1-continued

| Working Medium | Melting Point (° C.) | Boiling Point (° C. at 101.3 kPa) | Approximate Useful Range (° C.) |
|---|---|---|---|
| Toluene | −95 | 110 | 50 to 200 |
| Mercury | −39 | 361 | 250 to 650 |
| Sodium | 98 | 892 | 600 to 1200 |
| Lithium | 179 | 1340 | 1000 to 1800 |
| Silver | 960 | 2212 | 1800 to 2300 |

Both of the vapor cooling assemblies 40A and 40B can utilize the same working medium, or different working media. In other words, it is possible to match the working medium at a particular location to the anticipated operating conditions at that location. In further embodiments, the engine system 10 can be configured such that vapor cooling assemblies with different working media are provided that each operates within a discrete range of an overall anticipated range of operating condition temperatures.

It should be noted that thermal energy is conducted across containment structures of the first and second vaporization sections 42A and 42B and the first and second condenser sections 44A and 44B in order to pass to or from the vapor cooling assemblies 40A and 40B. The containment structures of the vapor cooling assemblies 40A and 40B are generally configured to be as thin as possible while still providing suitable structural integrity. Metallic materials, such as nickel-based superalloys and other known aerospace alloys can be used. Optimal vapor cooling structural materials will vary according to the specific conditions associated with particular applications, although high-temperature alloys are preferred.

Thermal energy rejected from the condenser sections 44A and 44B is not wasted. Rather, thermal energy expelled from the condenser sections 44A and 44B is recaptured by heating the fan stream air, which contributes to the thrust output of the engine system 10.

Figure 2:
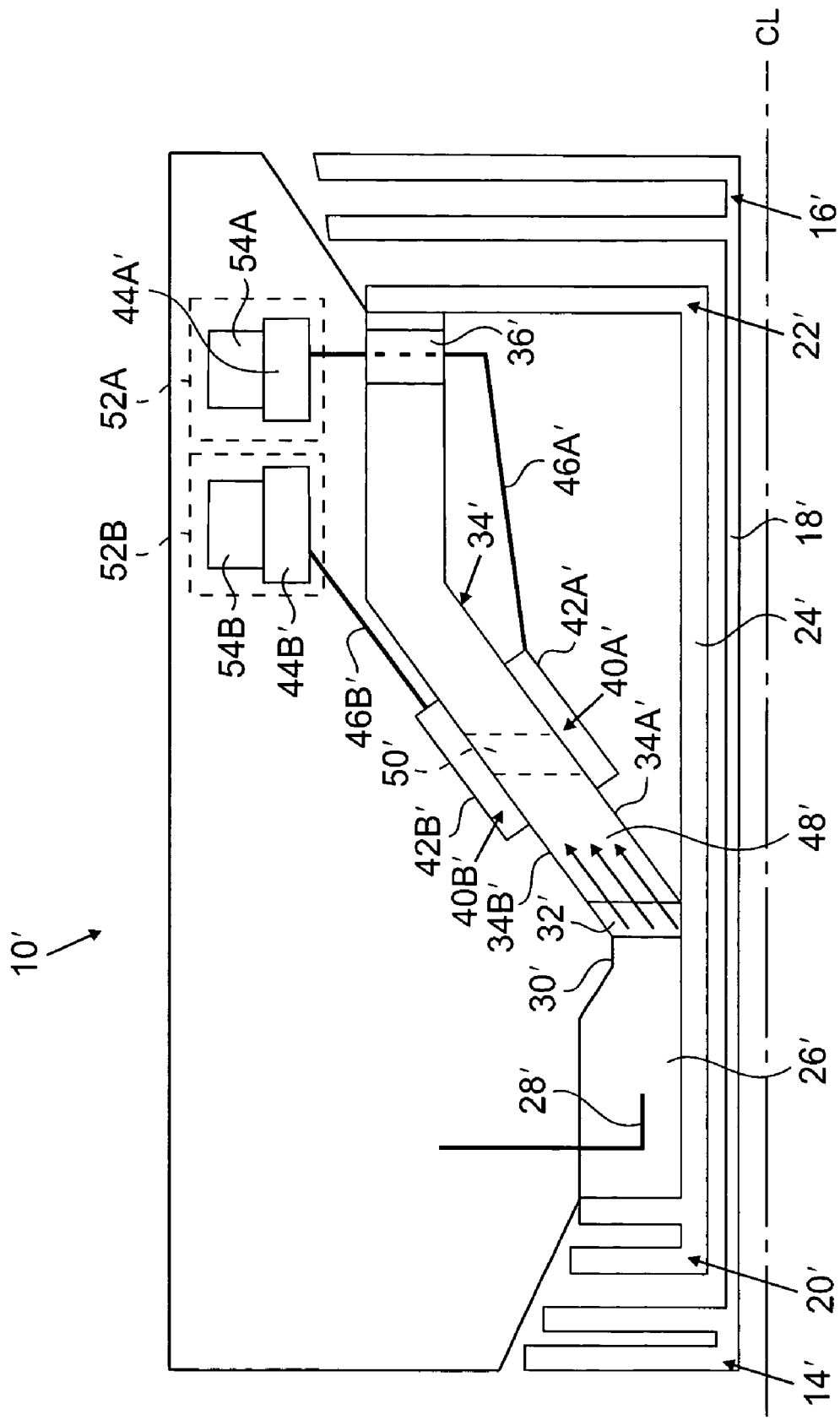
FIG. 2 is a schematic illustration of a turbojet engine system having a pair of vapor cooling assemblies according to the present invention.

FIG. 2 is a schematic illustration of a turbojet engine system 10' having first and second vapor cooling assemblies 40A' and 40B'. The illustrated embodiment of the engine system 10' is generally similar to the engine system 10 described above. However, the engine system 10' has a turbojet configuration for use with high speed aircraft, meaning that it lacks the fan section 12 and fan bypass duct 38 of the engine system 10 described above. Accordingly, first and second condenser sections 44A' and 44B' of the respective vapor cooling assemblies 40A' and 40B' are configured to be part of heat exchanger assemblies 52A and 52B, respectively, that expel thermal energy to fuel passing through adjacent fluid passageway structures 54A and 54B. It is well known that fuel for gas turbine engines can be used as a heat sink. Expelled thermal energy can optionally be used to superheat the fuel as desired. Expelling heat from the condensers 44A' and 44B' to the fuel in almost any manner allows that heat energy to be recaptured as thrust by the engine system 10'.

In the embodiment shown in FIG. 2, the heat exchanger assemblies 52A and 52B are located radially outside the main gas flowpath. However, the particular locations of each of the heat exchanger assemblies 52A and 52B can vary as desired for particular applications.

Although the present invention has been described with reference to preferred embodiments, workers skilled in the art will recognize that changes may be made in form and detail without departing from the spirit and scope of the invention. For example, the vapor cooling assembly of the present invention can be utilized with engine systems configured differently than those described above and shown in the figures, such as those having a combustion chamber that is non-conical in shape.

What is claimed is:

1. An engine cooling system comprising:
   a combustion chamber assembly configured to generate detonation waves, wherein the combustion chamber assembly defines a flowpath between an inner liner and an outer liner; and
   a first vapor cooling assembly that includes a vaporization section located adjacent to the flowpath and a condenser section spaced from the flowpath, wherein the first vapor cooling assembly is configured to transport thermal energy from the vaporization section to the condenser section through cyclical evaporation and condensation of a working medium sealed within the first vapor cooling assembly, and wherein the working medium removes thermal energy from at least one of the inner liner and the outer liner to provide cooling.

2. The system of claim 1, wherein the vaporization section of the first vapor cooling assembly is located adjacent to the inner liner of the combustion chamber assembly in order to cool the inner liner.

3. The system of claim 1 and further comprising:
   a second vapor cooling assembly that includes a vaporization section located adjacent to the outer liner of the combustion chamber assembly and a condenser section spaced from the combustion chamber assembly wherein the second vapor cooling assembly is configured to transport thermal energy from the vaporization section to the condenser section through cyclical evaporation and condensation of a working medium sealed within the second vapor cooling assembly, wherein the working medium of the second vapor cooling assembly removes thermal energy from the outer liner to provide cooling, and wherein the working medium of the first vapor cooling assembly removes thermal energy from the inner liner.

4. The system of claim 1, wherein the condenser section is located in a heat exchanger for transferring thermal energy from the working medium to fuel present in the heat exchanger.

5. The system of claim 1, wherein the condenser section is located at a fan bypass flowpath for transferring thermal energy from the working medium to air present in the fan bypass flowpath.

6. The system of claim 1 and further comprising:
   a spool having a compressor section and a turbine section, wherein the flowpath of the combustion chamber assembly is operatively positioned between the compressor section and the turbine section of the spool.

7. The system of claim 1, wherein the combustion chamber assembly defines a substantially conical portion of the flowpath.

8. An engine system comprising:
   a compressor section located at or near a main gas flowpath;
   a turbine section located at the main gas flowpath and connected to the compressor section for rotation therewith;
   a combustion chamber assembly located at or near the main gas flowpath and between the compressor section and the turbine section, wherein the combustion chamber assembly is configured to create detonation waves in the main gas flowpath, and wherein the combustion chamber assembly includes a substantially conically shaped region; and a first vapor cooling assembly that includes a vaporization section and a condenser section, wherein the vaporization section is located adjacent to the main gas flowpath at the conically shaped region of the combustion chamber, wherein the condenser section located away from the main gas flowpath, and wherein the first vapor cooling assembly is configured to transport thermal energy from the vaporization section to the condenser section through cyclical evaporation and condensation of a working medium sealed within the first vapor cooling assembly, wherein the first vapor cooling assembly is configured to transfer thermal energy from the working medium either to fuel present in a heat exchanger in which the condenser section is located or to air present in a fan bypass flowpath at which the condenser section is located.

9. The system of claim 8, wherein the vaporization section of the first vapor cooling assembly is located adjacent to a radially outer boundary wall of the combustion chamber to cool the radially outer boundary wall.

10. The system of claim 8 and further comprising:
a second vapor cooling assembly comprising:
a vaporization section located adjacent to an inner boundary wall of the combustion chamber; and
a condenser section located away from the main gas flowpath, wherein the second vapor cooling assembly is configured to transport thermal energy from the vaporization section to the condenser section through cyclical evaporation and condensation of a working medium sealed within the second vapor cooling assembly.

11. The system of claim 8, wherein the condenser section is located in the heat exchanger for transferring thermal energy from the working medium to fuel present in the heat exchanger.

12. The system of claim 8, wherein the condenser section is located at the fan bypass flowpath for transferring thermal energy from the working medium to air present in the fan bypass flowpath.

13. A method of cooling components of an engine, the method comprising:
providing a combustion gas flowpath for a fuel and air mixture, wherein the combustion gas flowpath is defined between a pair of containment liners;
generating a detonation wave in the combustion gas flowpath;
cooling the containment liners by transferring thermal energy away from the containment liners through a vaporization cycle, wherein the vaporization cycle utilizes vaporization and condensation of a working medium to transport thermal energy over a distance; and
recovering the transferred thermal energy with a fluid used for thrust production.

14. The method of claim 13 and further comprising:
transferring thermal energy from at least one of the containment liners to a fuel.

15. The method of claim 13 and further comprising:
transferring thermal energy from at least one of the containment liners to air in a fan bypass flowpath.

16. The method of claim 13, wherein the heat transferred away from the pair of containment liners is used to heat a thrust producing gas in the engine.

* * * * *